United States Patent
Min et al.

(10) Patent No.: US 9,675,936 B2
(45) Date of Patent: Jun. 13, 2017

(54) HOLLOW FIBER MEMBRANE MODULE

(71) Applicant: CHEIL INDUSTRIES INC., Gumi-si, Gyeongsangbuk-do (KR)

(72) Inventors: Gyu Hong Min, Uiwang-si (KR); Fufang Zha, Uiwang-si (KR)

(73) Assignees: Lotte Chemical Corporation, Seoul (KR); Lotte Advanced Materials Co., Ltd., Yeosu-si (KR)

( * ) Notice: Subject to any disclaimer, the term of this patent is extended or adjusted under 35 U.S.C. 154(b) by 131 days.

(21) Appl. No.: 14/142,650

(22) Filed: Dec. 27, 2013

(65) Prior Publication Data

US 2014/0183123 A1 Jul. 3, 2014

(30) Foreign Application Priority Data

Dec. 29, 2012 (KR) .................. 10-2012-0157687

(51) Int. Cl.
*B01D 63/04* (2006.01)
*B01D 69/08* (2006.01)
(Continued)

(52) U.S. Cl.
CPC ............. *B01D 63/04* (2013.01); *B01D 63/02* (2013.01); *B01D 69/081* (2013.01); *C02F 1/44* (2013.01);
(Continued)

(58) Field of Classification Search
CPC B01D 63/02; B01D 2315/06; B01D 2315/08; B01D 63/04; B01D 69/081; C02F 1/44
See application file for complete search history.

(56) References Cited

U.S. PATENT DOCUMENTS 8,104,748 B2   1/2012 Leister
8,173,018 B2 * 5/2012 Burr ................. B01D 65/00
                                                    210/232

(Continued)

FOREIGN PATENT DOCUMENTS

CN    101383422 A   3/2009
EP    0 282 355 A2  9/1988
(Continued)

OTHER PUBLICATIONS

Extended European Search Report dated Mar. 28, 2014 for corresponding Patent Application No. 13199671.2.
(Continued)

*Primary Examiner* — John Kim
(74) *Attorney, Agent, or Firm* — Lewis Roca Rothberger Christie LLP

(57) ABSTRACT

A hollow fiber membrane module including at least two types of hollow fiber membranes having different inner diameters, comprising first hollow fiber membranes and second hollow fiber membranes, and the equation $|P_A-P_0| \geq |P_B-P_0|$ where $P_0$ is an initial pressure applied to upper open ends of the first and second hollow fiber membranes, and $P_A$ and $P_B$ are respective pressures at lower open ends of the first and second hollow fiber membranes.

6 Claims, 4 Drawing Sheets

(51) Int. Cl.
    *C02F 1/44*        (2006.01)
    *B01D 63/02*       (2006.01)
(52) U.S. Cl.
    CPC ...... *B01D 2315/06* (2013.01); *B01D 2315/08* (2013.01)

(56) References Cited

U.S. PATENT DOCUMENTS

2008/0093752 A1    4/2008  Jeon
2011/0127683 A1    6/2011  Kim
2013/0020250 A1*   1/2013  Keller .................... B01D 61/58
                                                    210/321.87

FOREIGN PATENT DOCUMENTS

EP      2 153 882 A1    2/2010
JP      6-343837       12/1994
JP      2007-328994    12/2007
WO      WO 93/03828     3/1993

OTHER PUBLICATIONS

Office action limited Jun. 2, 2015 in corresponding Chinese Patent Application No. 201310743677.X, with English translation (12 pgs.).
Office Action mailed Jan. 28, 2016 in corresponding Chinese Patent Application No. 201310743677.X (7 pgs.).

* cited by examiner

HOLLOW FIBER MEMBRANE MODULE

CROSS-REFERENCE TO RELATED APPLICATION

This application claims priority to and the benefit of Korean Patent Application No. 10-2012-0157687, filed on Dec. 29, 2012 in the Korean Intellectual Property Office, the entire disclosure of which is incorporated herein by reference.

BACKGROUND

1. Field

Aspects of embodiments of the present invention relate to a hollow fiber membrane module.

2. Description of the Related Art

A separation membrane is an instrument for separating materials according to a size of molecules or repulsive force between the molecules and the separation membrane, and drive force of separation is pressure, density, potential difference, and the like. When used in a separation process, the separation membrane has advantages in that process automation is convenient and phase change and high temperature processing are not required, and thus has been studied and used as a technology capable of replacing separation processes in environmental pollution prevention facilities or chemical industries. The separation membrane may include a reverse osmosis membrane, a nanofiltration membrane, an ultrafiltration membrane, a microfiltration membrane, an ion-exchange membrane, a gas separation membrane, a pervaporation membrane, and the like.

Hollow fiber membrane modules are classified into a pressurizing type and a submerged type depending on an operating method thereof. A pressurizing type filtration apparatus allows only fluid other than solids such as impurities, sludge, and the like to selectively permeate into a hollow through a surface of a hollow fiber membrane, by applying pressure to the fluid to be treated.

Although the pressurizing type filtration apparatus requires separate facilities for fluid circulation, it has an advantage in that the amount of permeated water per unit time is greater than the submerged type filtration apparatus due to high working pressure. In the submerged type filtration apparatus, the hollow fiber membrane is directly dipped into a tank containing a fluid to be treated, and negative pressure is applied to the interior of the hollow fiber membrane, thereby allowing only the fluid other than solids such as impurities, sludge, and the like to selectively permeate into the hollow through the surface of the hollow fiber membrane. Although the submerged type filtration apparatus provides a smaller amount of permeated water per unit surface area and per unit time than the pressurizing type filtration apparatus, the submerged type filtration apparatus has advantages in that facilities for fluid circulation are not required and raw water containing many pollutants can be directly treated.

Both the pressurizing type and submerged type filtration apparatuses may be divided into a both-end water collection type, in which permeated water flowing into the hollow through the hollow fiber membrane is collected at both ends of the hollow fiber membrane, and a single-end water collection type, in which permeated water is collected at one end thereof.

Such a hollow fiber membrane module includes a plurality of hollow fiber membranes or a bundle of hollow fiber membranes having a predetermined length. However, since the hollow fiber membranes have a long cylindrical shape, the submerged type module entails pressure drop in a longitudinal direction of the hollow fiber membranes even upon application of negative pressure thereto, and the pressurizing type module also entails pressure drop in the longitudinal direction of the hollow fiber membranes even in the case where raw water is pressurized and introduced into the hollow fiber membranes. Therefore, it is not easy to achieve uniform filtration in the longitudinal direction of the hollow fiber membranes.

SUMMARY

According to an aspect of embodiments of the present invention, a hollow fiber membrane module includes at least two types of hollow fiber membranes having different inner diameters to achieve uniform or substantially uniform filtration efficiency in a longitudinal direction of the hollow fiber membranes.

According to one or more embodiments of the present invention, a hollow fiber membrane module includes at least two types of hollow fiber membranes having different inner diameters, comprising first hollow fiber membranes and second hollow fiber membranes, and satisfies Equation 1:

$$|P_A - P_0| \geq |P_B - P_0| \qquad \text{Equation 1}$$

where $P_0$ is an initial pressure applied to upper open ends of the first and second hollow fiber membranes, and $P_A$ and $P_B$ are respective pressures at lower open ends of the first and second hollow fiber membranes.

The first hollow fiber membranes may have an inner diameter ($D_A$) of about 0.4 mm to about 1.2 mm, and the second hollow fiber membranes may have an inner diameter ($D_B$) larger than the inner diameter ($D_A$) of the first hollow fiber membranes.

A total membrane area ratio of the first hollow fiber membranes to the second hollow fiber membranes may be about 1 or greater.

The hollow fiber membrane module may be a pressurizing type hollow fiber membrane module and $P_0$ may be greater than zero.

The pressurizing type hollow fiber membrane module may include a housing including a raw water inlet, a concentrated water outlet, a treated water outlet, and a plurality of the first and second hollow fiber membranes arranged inside the housing in a longitudinal direction of the housing.

The hollow fiber membrane module may be a submerged type hollow fiber membrane module and $P_0$ may be less than zero.

The submerged type hollow fiber membrane module may include a header, and a plurality of the first and second hollow fiber membranes potted in the header and arranged in a direction perpendicular to a longitudinal direction of the header.

BRIEF DESCRIPTION OF THE DRAWING

The above and other aspects, features, and principles of the present invention will become apparent from the following detailed description of some exemplary embodiments in conjunction with the accompanying drawings, in which.

DETAILED DESCRIPTION

Figure 1:
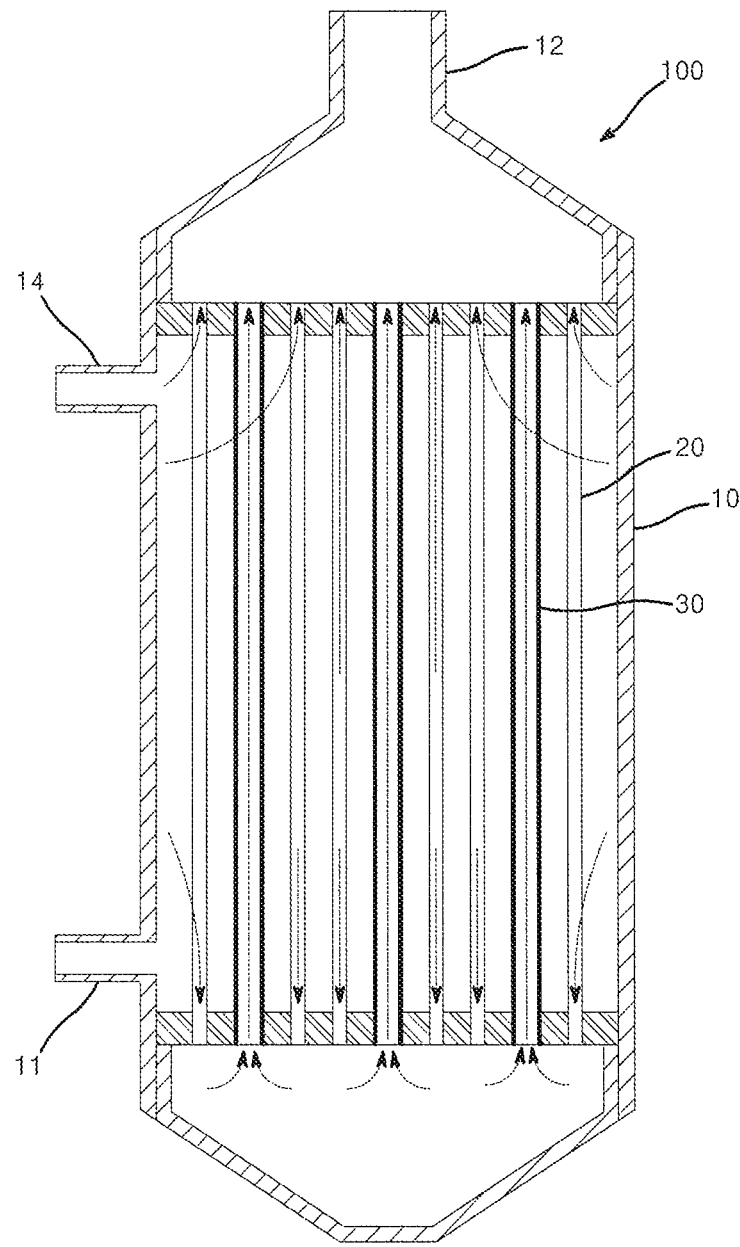
FIG. 1 is a sectional view of a pressurizing type hollow fiber membrane module according to an embodiment of the present invention.

Some exemplary embodiments of the present invention are described herein with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive. Also, it should be noted that the drawings may not be to precise scale and some of the dimensions, such as width, length, thickness, and the like, may be exaggerated for clarity of description in the drawings. Also, although some elements are illustrated in the drawings, for convenience of description, other elements may be omitted but will be easily understood by those skilled in the art. It is to be understood that when an element is referred to as being "on" or "under" another element, for example, the element may be directly formed on or under the other element, or one or more intervening elements may also be present therebetween. Like components are denoted by like reference numerals throughout the drawings.

Herein, expressions indicating spatial orientations, such as "upper end (portion)" and "lower end (portion)," are to be construed as indicating relative orientations instead of absolute orientations.

A pressurizing type hollow fiber membrane module according to an embodiment of the present invention is described below.

FIG. 1 is a sectional view of a pressurizing type hollow fiber membrane module according to an embodiment of the present invention. The pressurizing type hollow fiber membrane module 100, in one embodiment, includes a housing 10 and hollow fiber membranes 20 and 30 arranged inside the housing 10 in a longitudinal direction of the housing 10. The housing 10, in one embodiment, includes a raw water inlet 11 formed at a lower end of a sidewall thereof, a concentrated water outlet 14 formed at an upper end of the sidewall thereof, and a treated water outlet 12 formed at an upper end of the housing 10 such that treated water filtered through the hollow fiber membranes 20 and 30 is flowed therethrough. At least two types of the hollow fiber membranes 20 and 30 having different inner diameters and including first hollow fiber membranes 20 (hollow fiber membranes A) and second hollow fiber membranes 30 (hollow fiber membranes B) may be potted inside the housing 10.

For a hollow fiber membrane module including one type of hollow fiber membrane having an identical inner diameter, irrespective of a pressurizing type or a submerged type, it is not easy to achieve uniform filtration of raw water in the longitudinal direction of the hollow fiber membrane due to pressure drop. For example, in a hollow fiber membrane module having a length of about 2 m, filtration efficiency increases with decreasing distance between the module and a water collection unit. Specifically, the hollow fiber membrane module has high filtration efficiency within a distance of about 1 m to about 1.5 m from the water collection unit and is significantly deteriorated in filtration efficiency when placed at a distance of more than about 1.5 m from the water collection unit, thereby deteriorating overall filtration efficiency of the hollow fiber membrane module.

Theoretically, it is known that when fluid flows into any type of hollow pipes including a hollow fiber membrane, a pressure change in a longitudinal direction of the pipes is given by Equation 2, the Hagen-Poiseuille Equation:

$$\frac{\Delta P}{\Delta z} = \frac{128\eta}{\pi d_i^4} Q \qquad \text{Equation 2}$$

In Equation 2, P denotes pressure, denotes viscosity of fluid, Q denotes a flow rate of the fluid, z denotes a length of a pipe, and $d_i$ denotes an inner diameter of the pipe.

Figure 4:
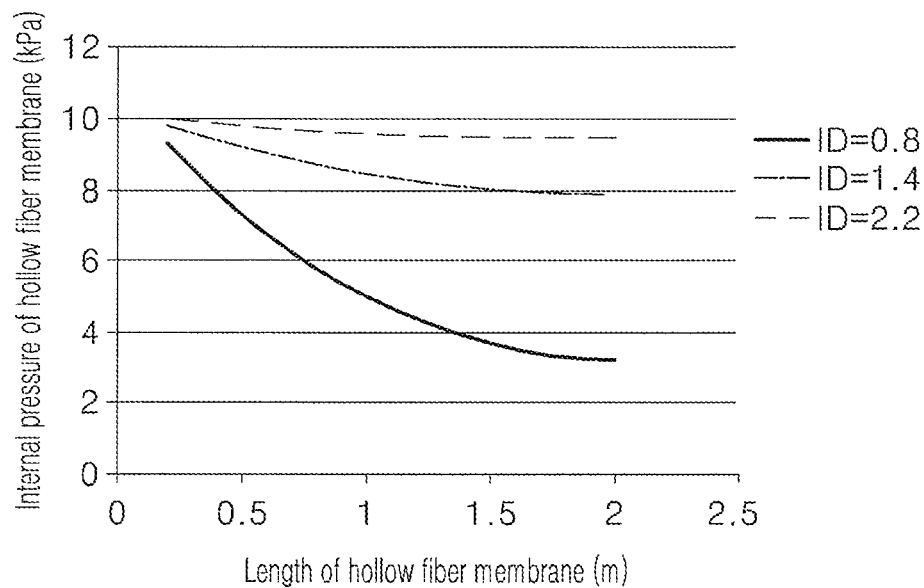
FIG. 4 is a graph showing pressure variation according to length of a hollow fiber membrane.

According to the Hagen-Poiseuille Equation, as the length of the hollow fiber membrane increases and the inner diameter of the hollow fiber membrane decreases, pressure deviation increases in the longitudinal direction thereof, and in the case of hollow fiber membranes having an identical length, pressure difference occurs between opposite ends thereof due to difference in inner diameter thereof. Accordingly, in order to improve water processing efficiency using the pressure difference, according to embodiments of the present invention, a hollow fiber membrane module includes at least two types of hollow fiber membranes having different inner diameters that are intermingled with each other. FIG. 4 shows examples of pressure variation according to length of hollow fiber membranes, and it can be seen that drastic pressure drop occurs as the inner diameter decreases and the length increases.

Figure 2:
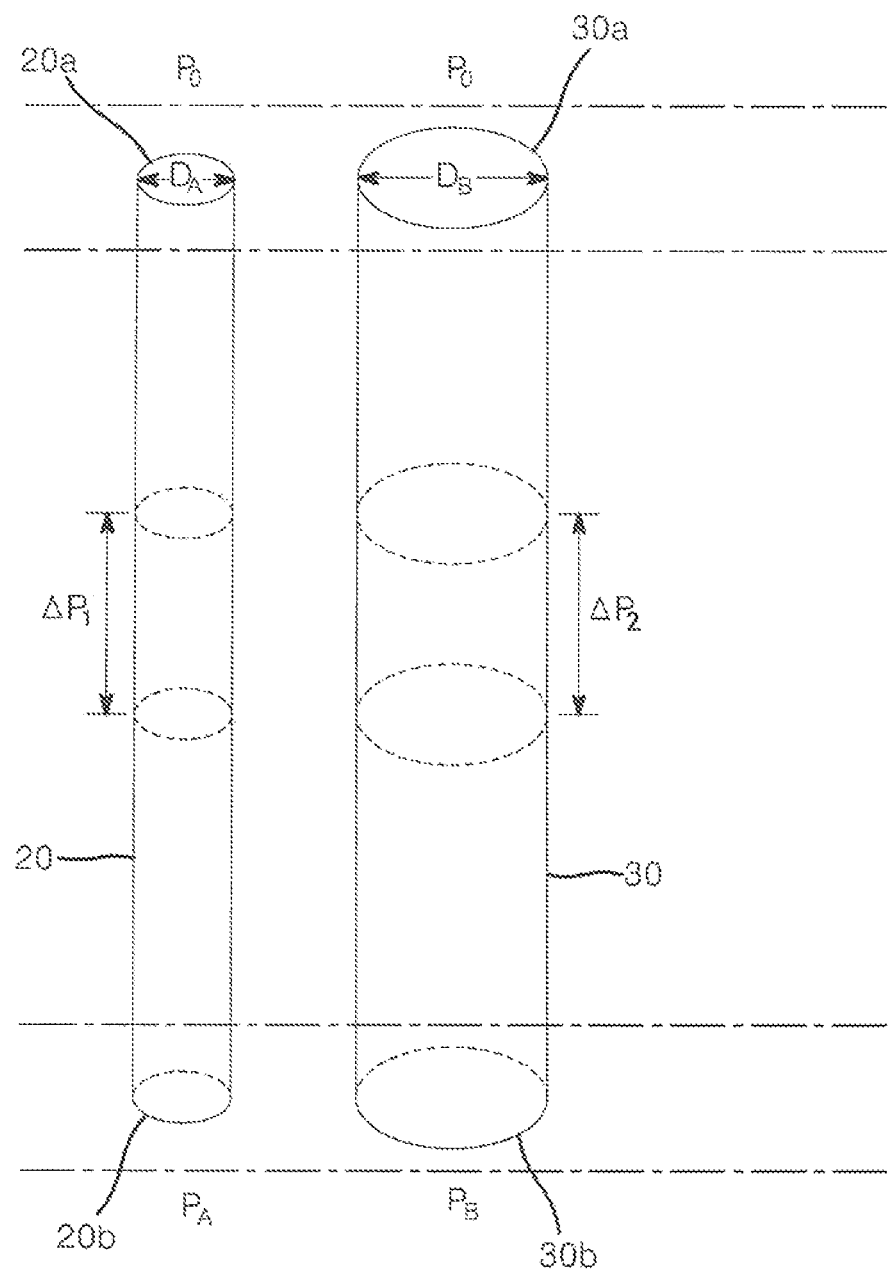
FIG. 2 is a schematic perspective view of two unit hollow fiber membranes.

FIG. 2 is a schematic view of two unit hollow fiber membranes of the hollow fiber membrane module, which include the first hollow fiber membranes 20 (hollow fiber membranes A) and the second hollow fiber membranes 30 (hollow fiber membranes B) having different inner diameters. The hollow fiber membrane B has a tubular shape, which has an inner diameter $D_B$ larger than an inner diameter $D_A$ of the hollow fiber membrane A. Each of the hollow fiber membranes A and B is open at opposite ends thereof. As shown in FIG. 2, assuming that an upper open end 20a of the hollow fiber membrane A and an upper open end 30a of the hollow fiber membrane B are coplanar with each other, and a lower open end 20b of the hollow fiber membrane A and a lower open end 30b of the hollow fiber membrane B are coplanar with each other, a pressure drop in a longitudinal direction of the hollow fiber membrane A is greater than a pressure drop in a longitudinal direction of the hollow fiber membrane B having a larger inner diameter than the hollow fiber membrane A. That is, $\Delta P1$ is greater than $\Delta P2$.

Figure 5:
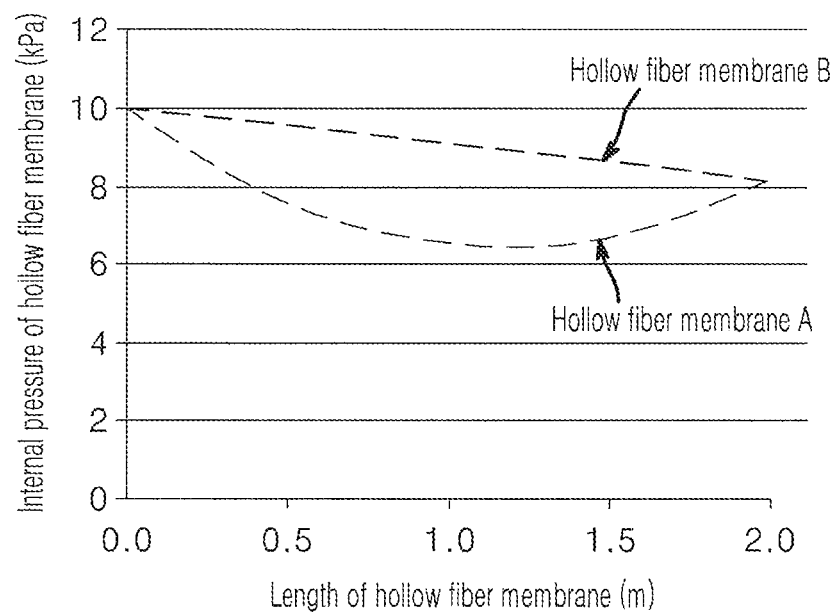
FIG. 5 is a graph showing pressure distribution inside hollow fiber membranes of a hollow fiber membrane module, according to an embodiment of the present invention.

FIG. 4 shows pressure distribution inside the hollow fiber membranes according to diameters of the hollow fiber membranes. Referring to FIGS. 2 and 4, it can be seen that pressure $P_A$ at the lower open end 20b of the hollow fiber membrane A is less than pressure $P_B$ at the lower open end 30b of the hollow fiber membrane B even when the same pressure is applied to the upper open ends of the hollow fiber membranes A and B through introduction of raw water. However, in the case where the hollow fiber membranes A and B are potted in the pressurizing type module as shown in FIG. 1, the lower open ends of the hollow fiber membranes A and B are fluidically communicated with each other, such that pressure is maintained at the same level at the lower open ends and treated water collected at a lower end of the module may be transported to an upper portion of the module through the hollow fiber membrane B according to a pressure loss difference between internal areas adjacent the lower open ends of the hollow fiber membranes A and B. Referring to FIG. 5, it can be seen that, when the lower open ends of the hollow fiber membranes A and B are fluidically communicated with each other, the pressure is maintained at the same level at the lower open ends.

Accordingly, despite a single treated water outlet, the pressurizing type module shown in FIG. 1 may provide the same effects as those of the pressurizing type module for both-end water collection, which is provided at opposite ends thereof with treated water outlets, without a separate pipe configuration.

The pressurizing type hollow fiber membrane module is provided with the at least two types of hollow fiber membranes having different inner diameters and including the hollow fiber membranes A and B, and satisfies Equation 1 wherein initial pressure applied to the upper open ends of the hollow fiber membranes A and B is $P_0$ and pressures at the lower open ends of the hollow fiber membranes A and B are $P_A$ and $P_B$, respectively. In the pressurizing type hollow fiber membrane module, $P_0$ is greater than zero.

$$|P_A-P_0| \geq P_B-P_0|$$  Equation 1

In one embodiment, the pressurizing type hollow fiber membrane module satisfies $|P_A-P_0| \geq P_B-P_0|$.

In one embodiment, the hollow fiber membranes A have an inner diameter $D_A$ of about 0.4 mm to about 1.2 mm, and the hollow fiber membranes B have an inner diameter $D_B$ larger than the inner diameter $D_A$ of the hollow fiber membranes A.

A total membrane area ratio (A/B) of the hollow fiber membranes A and B may vary depending upon outer diameters of the membranes, and may be about 1 or more, and, in one embodiment, is about 2 or more. The membrane area means a total area of outer peripheral surfaces of unit hollow fiber membranes.

Figure 3:
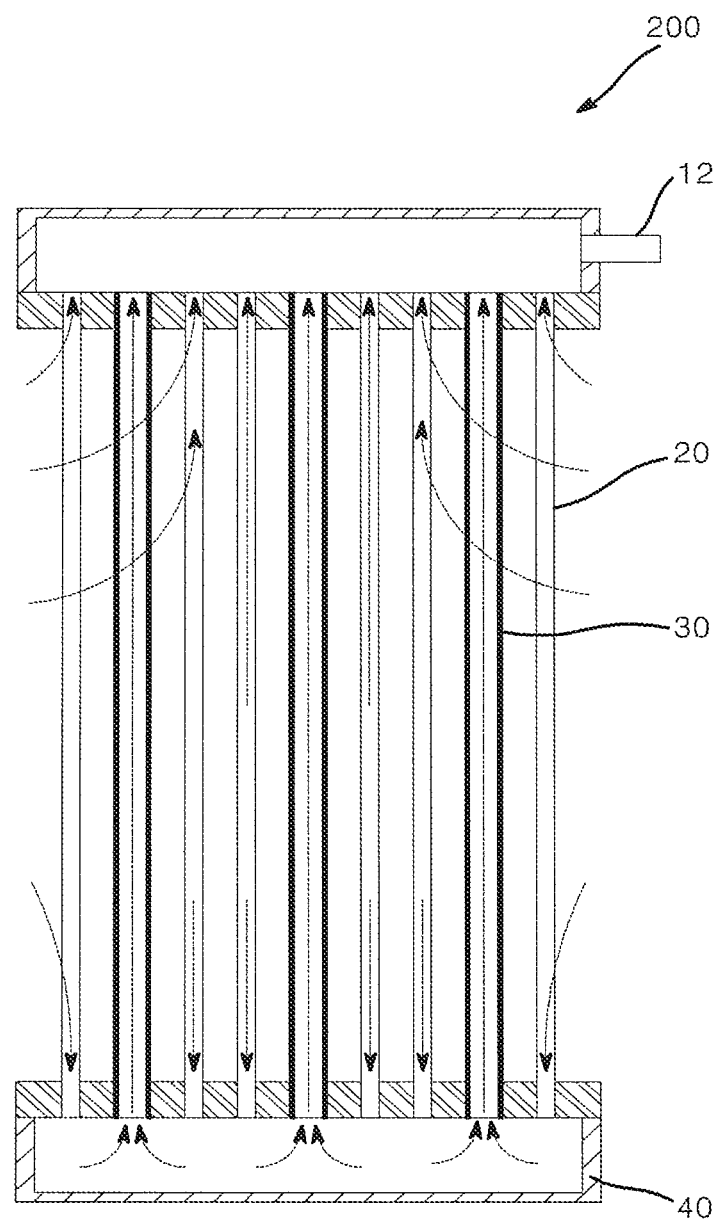
FIG. 3 is a sectional view of a submerged type hollow fiber membrane module according to another embodiment of the present invention.

A submerged type hollow fiber membrane module according to another embodiment of the present invention is described below. FIG. 3 is a sectional view of a submerged type hollow fiber membrane module according to another embodiment of the present invention.

Referring to FIG. 3, a submerged type hollow fiber membrane module 200 according to another embodiment of the present invention includes a header 40 and a plurality of the first hollow fiber membranes 20 (hollow fiber membranes A) and the second hollow fiber membranes 30 (hollow fiber membranes B) that are potted in the header 40 and arranged in a direction perpendicular to a longitudinal direction of the header 40. The pressurizing type hollow fiber membrane module described above requires a housing enclosing the hollow fiber membranes for pressurization. However, in the submerged type hollow fiber membrane module 200, the hollow fiber membranes may be open to raw water through the header 40 fastening the plurality of hollow fiber membranes or a bundle of hollow fiber membranes, since negative pressure is applied to an upper end of the module.

Even in the case of the submerged type hollow fiber membrane module, negative pressure is applied to the upper end of the module, and thus, a pressure drop occurs in the longitudinal direction of the hollow fiber membranes. Accordingly, in the case of the submerged type module using one type of hollow fiber membrane having an identical inner diameter, negative pressure generating drive force that allows raw water to permeate into the hollow fiber membranes from outside may not be secured at a lower portion of the hollow fiber membranes. Similar to the aforementioned pressurizing type hollow fiber membrane module, the submerged type hollow fiber membrane module according to an embodiment of the present invention also includes at least two types of hollow fiber membranes having different diameters so as to achieve uniform or substantially uniform filtration in the longitudinal direction of the hollow fiber membranes.

Referring back to FIG. 2, initial negative pressure $P_0$ applied to the upper end of the submerged type module is the same at upper open ends 20a of the hollow fiber membranes A and at upper open ends 30a of the hollow fiber membranes B. However, a pressure drop $\Delta P1$ in the longitudinal direction of the hollow fiber membranes A may be greater than a pressure drop $\Delta P2$ in the longitudinal direction of the hollow fiber membranes B having a larger inner diameter than the hollow fiber membranes A. Accordingly, as shown in FIG. 2, negative pressure $P_B$ at lower open ends 30b of the hollow fiber membranes B may be less than negative pressure $P_A$ at lower open ends 20b of the hollow fiber membranes A, whereby drive force can be generated at the lower ends of the hollow fiber membranes A, thereby providing more uniform filtration efficiency in the longitudinal direction of the hollow fiber membranes A.

The submerged type hollow fiber membrane module is provided with the at least two types of hollow fiber membranes having different inner diameters and including the hollow fiber membranes A and B, and satisfies Equation 1, where initial pressure applied to the upper open ends of the hollow fiber membranes A and B is $P_0$ and pressures at the lower open ends of the hollow fiber membranes A and B are $P_A$ and $P_B$, respectively. In the case of the submerged type hollow fiber membrane module, $P_0$ is less than zero.

$$|P_A-P_0| \geq P_B-P_0|$$  Equation 1

In one embodiment, the hollow fiber membranes A have an inner diameter $D_A$ of about 0.4 mm to about 1.2 mm, and the hollow fiber membranes B have an inner diameter $D_B$ larger than the inner diameter $D_A$ of the hollow fiber membranes A.

Although a total membrane area ratio (A/B) of the hollow fiber membranes A and B may vary depending upon outer diameters of the membranes, the total membrane area ratio, in one embodiment, is about 1 or more.

Embodiments of the present invention are described in further detail below with reference to some examples. These examples are provided for purposes of illustration and should not be construed in any way as limiting the scope of the present invention.

Examples 1 to 15 and Comparative Examples 1 to 3

Measurement of Water Throughput in Pressurizing Type Module

Example 1

A pressurizing type module (8 inch diameter) in the form as shown in FIG. 1, in which hollow fiber membranes A and B having a length of 2 m and different inner diameters are potted, was prepared. A filling rate of the hollow fiber membranes restricted by a size of a housing or water collection header of the module was fixed to 47%. The hollow fiber membranes A had an inner diameter of 0.8 mm, the hollow fiber membranes B had an inner diameter of 3.9 mm, and both hollow fiber membranes A and B had a water permeability of 800 L/m²/hr/bar. When the module had a working pressure of 10 kPa, the water throughput of the module was measured after the hollow fiber membranes A and B were potted in the module to have a membrane area ratio as shown in Table 1. The measured values are shown in Table 1. The membrane area of the hollow fiber membranes means a total area of outer peripheral surfaces of unit hollow fiber membranes, and an outer diameter of the hollow fiber membranes applied to calculate the total area of the outer peripheral surfaces of the hollow fiber membranes was measured using expressions obtained through experimentation.

Membrane area of hollow fiber membranes=Total area of outer peripheral surfaces of hollow fiber membranes=$\pi \times$(outer diameter of hollow fiber membranes)×(length of hollow fiber membranes)×(the number of potted hollow fiber membranes)

Membrane area ratio (%) of hollow fiber membranes $A$=(Total membrane area of hollow fiber membranes A/Total membrane area of hollow fiber membranes A and B)×100

Membrane area ratio (%) of hollow fiber membranes $B$=(Total membrane area of hollow fiber membranes B/Total membrane area of hollow fiber membranes A and B)×100

Outer diameter of hollow fiber membranes=Inner diameter of hollow fiber membranes×1.21+0.28 put per module varied depending upon the membrane areas and the membrane area ratios of the hollow fiber membranes A and B. When the membrane area ratio of the hollow fiber membranes B having a larger inner diameter than the hollow fiber membranes A was 3%, a maximum water throughput per module was obtained. Further, when the membrane area ratio of the hollow fiber membranes B was greater than 3%, total membrane area decreased such that the water throughput was reduced, and when the membrane area ratio of the hollow fiber membranes B was less than 3%, a pressure drop at lower ends of the hollow fiber membranes increased such that the water throughput was reduced.

Examples 2 to 13 and Comparative Example 1

In Examples 2 to 13, water throughput of a pressurizing type module was measured when the inner diameter of hollow fiber membranes A was fixed to 0.8 mm and the inner diameter of hollow fiber membranes B was changed in the range from 1 mm to 58 mm to have a membrane area as shown in Table 2. In Comparative Example 1, water throughput of a pressurizing type module was measured when only a single type of hollow fiber membrane having a length of 2 m and an inner diameter of 0.8 mm was potted.

TABLE 1

| Example 1 | | | | | | | | |
|---|---|---|---|---|---|---|---|---|
| Membrane area ratio (%) of hollow fiber membrane A | 92 | 93 | 94 | 95 | 96 | 97 | 98 |
| Membrane area ratio (%) of hollow fiber membrane B | 8 | 7 | 6 | 5 | 4 | 3 | 2 |
| Membrane area (m²) of hollow fiber membrane A | 58.9 | 60.9 | 63.1 | 65.3 | 67.7 | 70.2 | 72.8 |
| Membrane area (m²) of hollow fiber membrane B | 5.1 | 4.6 | 4.0 | 3.4 | 2.8 | 2.2 | 1.5 |
| Total membrane area (m²) | 64.0 | 65.5 | 67.1 | 68.7 | 70.5 | 72.4 | 74.3 |
| Water throughput per module (m³/d) | 86.7 | 88.0 | 89.1 | 90.1 | 90.8 | 90.9 | 89.5 |

As shown in Table 1, when the inner diameters of the hollow fiber membranes A and B were fixed, water through-

TABLE 2

| | Length of hollow fiber membrane (m) | Hollow fiber membrane A | | Hollow fiber membrane B | | Total membrane area (m²) | Water throughput (m³/day) | Increasing rate of water throughput |
|---|---|---|---|---|---|---|---|---|
| | | Inner diameter (mm) | Membrane area (m²) | Inner diameter (mm) | Membrane area (m²) | | | |
| Comparative Example 1 | 2 | 0.8 | 78.5 | — | — | 78.5 | 71.2 | — |
| Example 2 | 2 | 0.8 | 35.2 | 1 | 35.2 | 70.4 | 77.4 | 8.7% |
| Example 3 | 2 | 0.8 | 47.3 | 1.4 | 20.3 | 67.6 | 81.9 | 15.0% |
| Example 4 | 2 | 0.8 | 59.7 | 2.2 | 8.1 | 67.8 | 84.2 | 18.3% |
| Example 5 | 2 | 0.8 | 65.7 | 3.1 | 4.2 | 69.9 | 88.4 | 24.2% |
| Example 6 | 2 | 0.8 | 70.6 | 5.5 | 1.5 | 72.1 | 94.4 | 32.6% |
| Example 7 | 2 | 0.8 | 73.3 | 7.2 | 0.8 | 74.1 | 97.2 | 36.5% |
| Example 8 | 2 | 0.8 | 75.4 | 8.8 | 0.4 | 75.8 | 98.6 | 38.5% |
| Example 9 | 2 | 0.8 | 74.9 | 10.5 | 0.4 | 75.3 | 100.2 | 40.7% |
| Example 10 | 2 | 0.8 | 75.4 | 15.4 | 0.2 | 75.6 | 102.2 | 43.5% |

TABLE 2-continued

|  | Length of hollow fiber membrane (m) | Hollow fiber membrane A | | Hollow fiber membrane B | | Total membrane area ($m^2$) | Water throughput ($m^3$/day) | Increasing rate of water throughput |
|---|---|---|---|---|---|---|---|---|
|  |  | Inner diameter (mm) | Membrane area ($m^2$) | Inner diameter (mm) | Membrane area ($m^2$) |  |  |  |
| Example 11 | 2 | 0.8 | 75.8 | 20 | 0.1 | 75.9 | 103.3 | 45.1% |
| Example 12 | 2 | 0.8 | 67.7 | 41 | 0.3 | 68.0 | 94.3 | 32.4% |
| Example 13 | 2 | 0.8 | 57.2 | 57 | 0.4 | 57.6 | 80.8 | 13.5% |

As shown in Table 2, in Examples 2 to 13 in which two types of hollow fiber membranes having different inner diameters were used, the module had a higher water throughput than that of the module in Comparative Example 1 in which only a single type of hollow fiber membrane A having an inner diameter of 0.8 mm was used.

Example 14 and Comparative Example 2

Example 14

Water throughput of a pressurizing type module as shown in Table 3 was measured under the same conditions as in Example 1, except that hollow fiber membranes A had an inner diameter of 0.4 mm, hollow fiber membranes B had an inner diameter of 1.2 mm, and the module had a length of 1 m.

Comparative Example 2

Water throughput of a pressurizing type module as shown in Table 4 was measured under the same conditions as in Example 14, except that the module was prepared using only hollow fiber membranes A having an inner diameter of 0.4 mm.

As shown in Tables 3 and 4, the water throughput per module in Example 14 was up to 16% higher than that in Comparative Example 2 under the same conditions.

Example 15 and Comparative Example 3

Example 15

Water throughput of a pressurizing type module as shown in Table 5 was measured under the same conditions as in Example 1, except that hollow fiber membranes A had an inner diameter of 1.2 mm and hollow fiber membranes B had an inner diameter of 3.9 mm.

Comparative Example 3

Water throughput of a pressurizing type module as shown in Table 6 was measured under the same conditions as in Example 15, except that the module was prepared using only hollow fiber membranes A having an inner diameter of 1.2 mm.

TABLE 3

| Example 14 | Membrane area ratio (%) of hollow fiber membrane A | 50 | 60 | 70 | 80 | 86 | 88 | 90 |
|---|---|---|---|---|---|---|---|---|
|  | Membrane area ratio (%) of hollow fiber membrane B | 50 | 40 | 30 | 20 | 14 | 12 | 10 |
|  | Membrane area ($m^2$) of hollow fiber membrane A | 21.82 | 28.36 | 36.10 | 45.38 | 51.90 | 54.26 | 56.72 |
|  | Membrane area ($m^2$) of hollow fiber membrane B | 21.82 | 18.91 | 15.47 | 11.34 | 8.45 | 7.40 | 6.30 |
|  | Total membrane area ($m^2$) | 43.63 | 47.27 | 51.57 | 56.72 | 60.34 | 61.66 | 63.02 |
|  | Water throughput per module ($m^3$/d) | 23.99 | 30.27 | 34.79 | 37.78 | 38.47 | 38.36 | 37.98 |

TABLE 4

|  | Length of hollow fiber membrane (m) | Hollow fiber membrane A | | Hollow fiber membrane B | | Total membrane area ($m^2$) | Water throughput ($m^3$/day) |
|---|---|---|---|---|---|---|---|
|  |  | Inner diameter (mm) | Membrane area ($m^2$) | Inner diameter (mm) | Membrane area ($m^2$) |  |  |
| Comparative Example 2 | 1 | 0.4 | 70.9 | — | — | 70.9 | 33.20 |

TABLE 5

| Example 15 | | | | | | | | |
|---|---|---|---|---|---|---|---|---|
| | Membrane area ratio (%) of hollow fiber membrane A | 92 | 93 | 94 | 95 | 96 | 97 | 98 |
| | Membrane area ratio of hollow fiber (%) membrane B | 8 | 7 | 6 | 5 | 4 | 3 | 2 |
| | Membrane area (m$^2$) of hollow fiber membrane A | 45.65 | 46.90 | 48.17 | 49.50 | 50.83 | 52.25 | 53.66 |
| | Membrane area (m$^2$) of hollow fiber membrane B | 3.99 | 3.53 | 3.08 | 2.60 | 2.12 | 1.61 | 1.10 |
| | Total membrane area (m$^2$) | 49.64 | 50.44 | 51.25 | 52.10 | 52.95 | 53.86 | 54.77 |
| | Water throughput per module (m$^3$/d) | 82.5 | 83.37 | 83.97 | 84.52 | 84.82 | 84.74 | 83.96 |

TABLE 6

| | Length of hollow fiber membrane (m) | Hollow fiber membrane A | | Hollow fiber membrane B | | Total membrane area (m$^2$) | Water throughput (m$^3$/day) |
|---|---|---|---|---|---|---|---|
| | | Inner diameter (mm) | Membrane area (m$^2$) | Inner diameter (mm) | Membrane area (m$^2$) | | |
| Comparative Example 3 | 2 | 1.2 | 56.72 | — | — | 56.72 | 81.48 |

As shown in Tables 5 and 6, the water throughput per module in Example 15 was up to 4% higher than that in Comparative Example 3 under the same conditions.

Examples 16 to 28 and Comparative Example 4

Measurement of Water Throughput in Submerged Type Module

Example 16

A submerged type module in the form as shown in FIG. 3, in which hollow fiber membranes A and B having a length of 2 m and different inner diameters are potted, was prepared. A header of the module had a section of 800 mm long and 50 mm wide, and a filling rate of the hollow fiber membranes was fixed to 22%. The hollow fiber membranes A had an inner diameter of 1.0 mm, the hollow fiber membranes B had an inner diameter of 5.5 mm. When the module had a working pressure of 5 kPa, the water throughput of the module was measured after the hollow fiber membranes A and B were potted in the module to have a membrane area ratio as shown in Table 7. The measured values are shown in Table 7. The membrane area of the hollow fiber membranes means a total area of outer peripheral surfaces of unit hollow fiber membranes, and an outer diameter of the hollow fiber membranes applied to calculate the total area of the outer peripheral surfaces of the hollow fiber membranes was measured using expressions obtained through experimentation.

Area of hollow fiber membranes=Total area of outer peripheral surfaces of hollow fiber membranes=π×(Outer diameter of hollow fiber membranes)×(Length of hollow fiber membranes)×(the number of potted hollow fiber membranes)

Outer diameter of hollow fiber membranes=Inner diameter of hollow fiber membranes×1.21+0.28

TABLE 7

| Example 16 | | | | |
|---|---|---|---|---|
| | Membrane area ratio (%) of hollow fiber membrane A | 97 | 98 | 99 |
| | Membrane area ratio (%) of hollow fiber membrane B | 3 | 2 | 1 |
| | Membrane area (m$^2$) of hollow fiber membrane A | 35.1 | 36.6 | 38.1 |
| | Membrane area (m$^2$) of hollow fiber membrane B | 1.1 | 0.7 | 0.4 |
| | Total membrane area (m$^2$) | 36.2 | 37.3 | 38.5 |
| | Water throughput per module (m$^3$/d) | 29.78 | 30.14 | 29.99 |

As shown in Table 7, when the inner diameters of the hollow fiber membranes A and B were fixed, water throughput per module varied depending upon the membrane areas and the membrane area ratios of the hollow fiber membranes A and B. When the membrane area ratio of the hollow fiber membranes B having a larger inner diameter than the hollow fiber membranes A was 2%, a maximum water throughput per module was obtained. Further, when the membrane area ratio of the hollow fiber membranes B was greater than 2%, a total membrane area decreased such that the water throughput was reduced, and when the membrane area ratio of the hollow fiber membranes B was less than 2%, a pressure drop at lower ends of the hollow fiber membranes increased such that the water throughput was reduced.

Examples 17 to 28 and Comparative Example 4

In Examples 17 to 28, water throughput of a pressurizing type module was measured when hollow fiber membranes A had an inner diameter of 1.0 mm and the inner diameter of hollow fiber membranes B was changed in the range of 1.4 mm to 40.9 mm to have a membrane area as shown in Table 8 below. Measurement results are shown in Table 8.

In Comparative Example 4, water throughput of a pressurizing type module was measured when only single hollow fiber membranes having a length of 2 m and an inner diameter of 1.0 mm were potted. Measurement results are shown in Table 8.

TABLE 8

| | Hollow fiber membrane A | | Hollow fiber membrane B | | | | |
|---|---|---|---|---|---|---|---|
| | Inner diameter (mm) | Membrane area (m²) | Inner diameter (mm) | Membrane area (m²) | Total membrane area (m²) | Throughput of water (m³/day) | Increasing rate of water throughput |
| Comparative Example 4 | 1.0 | 39.85 | — | 0 | 25.87 | 25.87 | — |
| Example 17 | 1.0 | 21.74 | 1.4 | 14.49 | 36.23 | 28.51 | 10% |
| Example 18 | 1.0 | 34.25 | 2.2 | 2.99 | 37.24 | 28.05 | 8% |
| Example 19 | 1.0 | 36.32 | 3.9 | 1.13 | 37.45 | 29.32 | 13% |
| Example 20 | 1.0 | 37.57 | 7.2 | 0.41 | 37.97 | 30.90 | 19% |
| Example 21 | 1.0 | 38.57 | 8.8 | 0.19 | 38.76 | 31.24 | 21% |
| Example 22 | 1.0 | 38.06 | 10.5 | 0.22 | 38.28 | 31.72 | 23% |
| Example 23 | 1.0 | 38.26 | 12.1 | 0.17 | 38.43 | 31.98 | 24% |
| Example 24 | 1.0 | 38.83 | 13.8 | 0.10 | 38.93 | 32.22 | 25% |
| Example 25 | 1.0 | 38.58 | 15.4 | 0.11 | 38.69 | 32.40 | 25% |
| Example 26 | 1.0 | 37.98 | 18.7 | 0.13 | 38.11 | 32.33 | 25% |
| Example 27 | 1.0 | 36.67 | 24.5 | 0.17 | 36.84 | 31.51 | 22% |
| Example 28 | 1.0 | 31.02 | 40.9 | 0.28 | 31.30 | 26.88 | 4% |

As shown in Table 8, an increasing rate of water throughput in Examples 17 to 28 in which the two types of hollow fiber membranes having different inner diameters were used was higher than that in Comparative Example 4 in which only the single hollow fiber membranes A having the inner diameter of 1.0 mm were used.

Example 29 and Comparative Example 5

Example 29

Water throughput as shown in Table 9 was measured under the same conditions as in Example 16, except that the module was a submerged type module in which hollow fiber membranes A had an inner diameter of 0.4 m, hollow fiber membranes B had an inner diameter of 1.4 mm, and the module had a length of 1 m.

Comparative Example 5

Water throughput as shown in Table 10 was measured under the same conditions as in Example 29, except that the module was a submerged type module prepared using only hollow fiber membranes A having an inner diameter of 0.4 mm and having a working pressure of 5 kPa.

TABLE 9

| Example 29 | Membrane area ratio (%) of hollow fiber membrane A | 70 | 80 | 86 | 88 | 90 | 92 |
|---|---|---|---|---|---|---|---|
| | Membrane area ratio (%) of hollow fiber membrane B | 30 | 20 | 14 | 12 | 10 | 8 |
| | Membrane area (m²) of hollow fiber membrane A | 21.378 | 27.251 | 31.479 | 33.022 | 34.656 | 36.372 |
| | Membrane area (m²) of hollow fiber membrane B | 9.1609 | 6.811 | 5.1208 | 4.505 | 3.8516 | 3.1604 |
| | Total membrane area (m²) | 30.54 | 34.06 | 36.60 | 37.53 | 38.51 | 39.53 |
| | Water throughput per module (m³/d) | 19.37 | 19.80 | 19.86 | 19.79 | 19.66 | 19.41 |

TABLE 10

| | | Hollow fiber membrane A | | Hollow fiber membrane B | | | |
|---|---|---|---|---|---|---|---|
| | Length of hollow fiber membrane (m) | Inner diameter (mm) | Membrane area (m²) | Inner diameter (mm) | Membrane area (m²) | Total membrane area (m²) | Water throughput (m³/day) |
| Comparative Example 5 | 1 | 0.4 | 44.28 | — | — | 44.28 | 14.11 |

As shown in Tables 9 and 10, the water throughput per module in Example 29 was up to 40% higher than that in Comparative Example 5 under the same conditions.

Example 30 and Comparative Example 6

Example 30

Water throughput as shown in Table 11 was measured under the same conditions as in Example 16, except that the module was a pressurizing type module in which hollow fiber membranes A had an inner diameter of 1.2 mm, hollow fiber membranes B had an inner diameter of 5.5 mm, and the module had a length of 2 m.

Comparative Example 6

Water throughput as shown in Table 12 was measured under the same conditions as in Example 29, except that the module was a submerged type module prepared using only hollow fiber membranes A having an inner diameter of 1.2 mm and having a working pressure of 5 kPa.

TABLE 11

| Example 30 | | | | | |
|---|---|---|---|---|---|
| Membrane area ratio (%) of hollow fiber membrane A | 96 | 97 | 98 | 99 |
| Membrane area ratio (%) of hollow fiber membrane B | 4 | 3 | 2 | 1 |
| Membrane area (m$^2$) of hollow fiber membrane A | 31.737 | 32.592 | 33.539 | 34.486 |
| Membrane area (m$^2$) of hollow fiber membrane B | 1.3289 | 1.0179 | 0.6786 | 0.3393 |
| Total membrane area (m$^2$) | 33.1 | 33.6 | 34.2 | 34.8 |
| Water throughput per module (m$^3$/d) | 27.94 | 28.07 | 28.09 | 27.87 |

TABLE 12

| | Length of hollow fiber membrane (m) | Hollow fiber membrane A | | Hollow fiber membrane B | | Total membrane area (m$^2$) | Water throughput (m$^3$/day) |
| | | Inner diameter (mm) | Membrane area (m$^2$) | Inner diameter (mm) | Membrane area (m$^2$) | | |
|---|---|---|---|---|---|---|---|
| Comparative Example 6 | 2 | 1.2 | 35.42 | — | — | 35.42 | 26.55 |

As shown in Tables 11 and 12, the water throughput per module in Example 30 is up to 5.8% higher than that in Comparative Example 6 under the same conditions.

Although some embodiments of the present invention have been described herein, the present invention is not limited to these embodiments and can be realized in various ways. Further, it should be understood by those skilled in the art that various modifications, variations, and alterations can be made without departing from the spirit and scope of the present invention. Accordingly, these embodiments are given by way of illustration only, and should not be construed in any way as limiting the present invention.

What is claimed is:

1. A hollow fiber membrane module comprising:
at least two types of hollow fiber membranes having different inner diameters, comprising first hollow fiber membranes and second hollow fiber membranes, outer peripheral surfaces of each of the first hollow fiber membranes and the second hollow fiber membranes being permeable to water for filtering water therethrough from outside the outer peripheral surfaces to respective hollows inside the first hollow fiber membranes and the second hollow fiber membranes,
wherein $P_0$ is an initial pressure applied to upper open ends of the first and second hollow fiber membranes, and $P_A$ and $P_B$ are respective pressures at lower open ends of the first and second hollow fiber membranes,
wherein lower ends of the first and second hollow fiber membranes are potted in a header that is closed to an outside of the hollow fiber membrane module, and the lower open ends of the first and second hollow fiber membranes are in fluid communication with each other, and
wherein the first hollow fiber membranes have an inner diameter of about 0.4 mm to about 1.2 mm, and the second hollow fiber membranes have an inner diameter larger than the inner diameter of the first hollow fiber membranes.

2. The hollow fiber membrane module according to claim 1, wherein a total membrane area ratio of a total area of the outer peripheral surfaces of the first hollow fiber membranes to a total area of the outer peripheral surfaces of the second hollow fiber membranes is about 1 or greater.

3. The hollow fiber membrane module according to claim 1, wherein the hollow fiber membrane module is a pressurizing type hollow fiber membrane module and $P_0$ is greater than zero.

4. The hollow fiber membrane module according to claim 3, wherein the pressurizing type hollow fiber membrane module comprises a housing including a raw water inlet, a concentrated water outlet, a treated water outlet, and a plurality of the first and second hollow fiber membranes arranged inside the housing in a longitudinal direction of the housing.

5. The hollow fiber membrane module according to claim 1, wherein the hollow fiber membrane module is a submerged type hollow fiber membrane module and $P_0$ is less than zero.

6. The hollow fiber membrane module according to claim 5, wherein the submerged type hollow fiber membrane module comprises:
the header; and
a plurality of the first and second hollow fiber membranes potted in the header and arranged in a direction perpendicular to a longitudinal direction of the header.

* * * * *